United States Patent Office 2,794,714
Patented June 4, 1957

2,794,714

FUEL ANTIKNOCK

John D. Bartleson, Franklin, Mich., assignor to Ethyl Corporation, New York, N. Y., a corporation of Delaware No Drawing. Application August 13, 1953,
Serial No. 374,158

8 Claims. (Cl. 44—63)

This invention relates to the improvement of organolead material, and in particular to adjuvants for tetraethyllead and tetraethyllead-containing compositions.

Organolead compounds such as tetraphenyllead, tetramethyllead, tetraethyllead, dimethyldiethyllead, and the like have long been known as antiknock agents for fuel for spark ignition type internal combustion engines. Of such materials, however, only tetraethyllead has attained commercial success because of its efficacious attributes. Likewise, it has long been known that the effective utilization of such antiknock agents is enhanced by providing antiknock fluids which consist of organic halogen compounds in admixture with an organolead compound.

Organolead compounds suffer one disadvantage, particularly during storage, handling, and blending operations, namely, their inherent instability. Thus, tetraethyllead and related compounds are susceptible of deterioration which is largely dependent upon the nature of the environment. For example, it has been found that organolead antiknock agents and antiknock fluids containing the same, when in contact with certain metals, such as copper and copper-containing alloys, tend to deteriorate, even in a reducing atmosphere. Such deterioration is postulated to result from an adverse catalytic activity exhibited by such metals. In other words, it is generally believed that copper and like metals act as self-perpetuating decomposition accelerators. Another condition enhancing the deterioration of such antiknock agents is contact with air. It is generally believed that atmospheric constituents, notably oxygen and ozone, tend to oxidize one or more of the lead-to-carbon bonds with the formation of insoluble decomposition products. Under these conditions there contemporaneously occurs a color change in the dyestuff normally present in antiknock fluids such that the visual identification of the product frequently becomes difficult, if not impossible. Organolead antiknock agents are likewise decomposed on exposure to strong light, particularly sunlight. In this case the decomposition is attributed to the catalytic decomposition of the organolead compounds by ultra-violet light. It is apparent, therefore, that the exposure of tetraethyllead and tetraethyllead-containing compositions to any or all of the above environments results in a number of operational difficulties, including loss of antiknock effectiveness, the formation of sludge and other types of sediment, and the like.

When organolead-containing compositions are utilized in internal combustion engines, other difficulties are frequently encountered. For example, in spite of the high degree of efficiency of the normal scavenger complement in antiknock fluids, the accumulation of engine deposits in the engine cannot be entirely prevented. Such deposition is particularly prevalent when spark ignition engines are operated under conditions of low speed and light load, such as encountered in metropolitan driving conditions. As a result of notable improvements in fuel antiknock quality which have been made in recent years, such deposits present but a few minor problems in low compression engines. However, because of the trend in the automotive industry of utilizing high compression engines in passenger cars and trucks, the accumulation of deposits results in a number of relatively serious problems, including increased detonation, deposit-induced autoignition or wild ping, spark plug fouling, reduction in exhaust valve life, and the like.

Of the problems previously enumerated, those of wild ping, spark plug fouling, and reduced exhaust valve life are of considerable concern to the automotive industry. This results from the fact that each time the lead concentration in the fuel is raised to coincide with increases in compression ratio to eliminate detonation, the magnitude of one or more of these problems generally increases. As a result, there is a paramount need existing for a new and improved method for altering the physical and chemical characteristics of deposits and for modifying the combustion process such that the well-known detrimental effects of the previously described deposit-induced engine phenomena can be markedly suppressed or be eliminated.

It is, therefore, an object of this invention to provide adjuvants for organolead compounds. It is likewise an object of this invention to provide means of improving compositions such as antiknock fluids and fuels which contain organolead antiknock agents. Similarly, the provision of improved organolead compositions is another object of this invention. A particular object of this invention is to provide improved tetraethyllead-containing fuels, especially those for use in spark ignition type internal combustion engines. In addition, an object of this invention is to provide methods of improving antiknock fluids such that during compounding, storage, and blending operations such materials are stabilized against the adverse effects of deteriorative environments. An additional object of the instant invention is to provide means of obviating deposit-induced phenomena of the character described hereinbefore. Other important objects of this invention will be apparent from the discussion hereinafter.

It has now been found that the above and other objects of this invention are attained by providing compositions of matter adapted for use as additives to fuel for spark-fired internal combustion engines comprising an organolead antiknock agent and, in quantity sufficient to stabilize or improve said agent, a metallic derivative of a product obtained by reaction between a phosphorus sulfide and an active hydrogen-containing aromatic compound. Therefore, the adjuvants of this invention are formed from the reaction product between such compounds as phosphorus pentasulfide ($P_2S_5$), phosphorus heptasulfide ($P_4S_7$), or the like and an active hydrogen-containing aromatic compound; that is, a compound which contains at least one aryl radical and a hydrogen atom activated thereby. For the sake of conciseness, such materials are termed hereinafter as the organic reactants.

It will be apparent that the organolead adjuvants of this invention are most readily prepared in two steps. The first step consists of preparing a product of a phosphorus sulfide and organic reactant of the type described hereinbefore. Depending upon the nature of the materials employed as well as the reaction conditions, the product of this reaction can be used in toto for the preparation of my metallic derivatives, or it can be subjected to intermediate treatment, as will be become apparent from the discussion hereinafter. The second step in the preparation of my adjuvants consists of reacting a salt of the desired metal with the above intermediate material.

The organic reactant used to prepare the reaction products used as intermediates in the preparation of my adjuvants is an active hydrogen-containing aromatic compound, that is, a compound in which a hydrogen atom is under the activating influence of at least one aromatic nucleus. Of such compounds specific reference is made to a particularly efficacious class which can be represented by the general formula

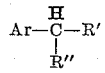

wherein Ar represents an aryl radical which can be further substituted with one or more univalent aliphatic or alicyclic radicals, and R' and R'' can be the same or different univalent organic radicals, preferably consisting solely of carbon and hydrogen. It will be apparent, therefore, that this class of active hydrogen-containing aromatic compounds can be considered as trihydrocarbon-substituted methanes wherein at least one of the substituents is an aryl radical. This class of reactants used to form the intermediates for the adjuvants of this invention is exemplified by dimethylphenylmethane (isopropyl benzene or cumene), methylethylphenylmethane, phenyldibutylmethane, hexylisooctylphenylmethane, undecyl di-(phenyl)methane, dicetylphenylmethane, tri-(phenyl)methane, o-cymene, m-cymene, p-cymene, diethyl-α-naphthylmethane, methyl di-β-naphthylmethane, and the like. Generally speaking, such active hydrogen-containing aromatic compounds preferably contain from 9 to about 40 carbon atoms in the molecule.

Other active hydrogen-containing aromatic intermediates for my adjuvants are those in which there is an active hydrogen in a di- or polycyclic compound. That is to say, as in the case of the methanes previously discussed, at least one hydrogen atom of such cyclic compounds is under the activating influence of an aryl nucleus. Illustrative examples of such compounds include 1,4-dihydro-5,8-dimethylnaphthalene, 1,4-dihydroanthracene; 1,4-dihydrofluorene; 5,8-dihydrophenanthrene; 1,4-dihydronaphthacene; 9,12-dihydrotriphenylene, and the like. It will be appreciated by one skilled in the art that under certain circumstances efficacious intermediates can be prepared from materials analogous to those just described, with the exception that they contain at least one heterocyclic nitrogen atom. Typical examples of such active hydrogen-containing aromatic compounds include 1,4-dihydroacridine; 1,4-dihydrophenazine; and the like.

Other suitable active hydrogen-containing aromatic compounds suitable for the preparation of the intermediates will be apparent to those skilled in the art.

While the organic reactants described thus far generally represent single chemical entities, it is frequently preferred to utilize as the reactant mixtures of the various materials, especially mixtures which are readily available as articles of commerce. By way of example, the reaction between propylene and benzene produces substantial quantities of cumene along with lesser quantities of other reaction products. Such substances, which are frequently used as components of aviation gasoline, can be employed in preparing my intermediates thereby materially enhancing the cost effectiveness of my compositions. Other readily available mixtures which can be utilized in the preparation of my intermediates will undoubtedly be familiar to one skilled in the art.

The phosphorus sulfide, the other prime reactant utilized in the preparation of my intermediates, is preferably a reactive compound such as $P_2S_5$ ($P_4S_{10}$) and $P_4S_7$. It is possible, however, to use certain of the other reported phosphorus sulfides under the proper reaction conditions. It will likewise be apparent that under suitable conditions the various sulfides of arsenic or antimony can be similarly employed in forming intermediates for use in the present invention.

The intermediate products for the preparation of the adjuvants of this invention are readily prepared, the reaction generally requiring only the addition of a reactive phosphorus sulfide to the organic reactant and heating the mixture at a temperature at which the reaction takes place as evidenced by the release of hydrogen sulfide until the reaction is substantially complete. The temperature of the reaction is largely dependent upon the nature of the individual reactants, although, generally speaking, temperatures in the order of about 200 to 500° F. are satisfactory. In preparing some of the intermediates for my adjuvants advantages are to be obtained by conducting the reaction under superatmospheric pressure which can be readily obtained by conducting the reaction in a closed vessel, thereby taking advantage of the pressure from the hydrogen sulfide formed.

The nature of the reaction products is somewhat contingent upon the ratio of the reactants. That is to say, variations in the character of the intermediates are achieved by utilizing different organic reactant-to-phosphorus sulfide mole ratios within the range from about 0.4 to 1 and about 5 to 1.

The reaction products can be made in the presence of a diluent, if desired, which may or may not be subsequently removed. Such diluents are illustrated by such substances as kerosene, straight run and catalytically cracked hydrocarbons of the diesel fuel boiling range, and the like.

The reaction products used to form my adjuvants defy precise chemical definition. For example, although it is generally believed that the reaction products contain a substantial proportion of material containing the characteristic chemical bonding

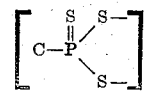

the true nature of the reaction is obscured by a number of competing factors. On the one hand, the ratio of the reactants determines to some extent the character of the intermediates as indicated hereinbefore. Furthermore, it is not inconceivable that the temperature at which the reaction is conducted will influence the amount and character of chemical cleavage, which is undoubtedly inherent in such reactions. Likewise, it will be apparent that the specific phosphorus sulfide employed will also have considerable bearing upon the nature of my intermediates. Nevertheless, there is considerable evidence attesting to the fact that the active hydrogen possessed by my prime organic reactants is coupled with sulfur atoms from the phosphorus sulfide such that there is a release of hydrogen sulfide and the provision of a complex molecular reaction mass. Summing up this point, therefore, it is in praesenti impossible to adequately define the nature of the intermediates because of the fact that the reaction mechanism is highly obscured by such factors as the operation of the law of mass action, reaction kinetics, steric factors, as well as consideration of the nature of the prime reactants employed. It may well be that with certain pure starting materials and with carefully controlled reaction conditions and concentrations, substantially pure reaction products are obtainable. However, an advantage inherent in this invention is the fact that it is not necessary to prepare substantially pure materials and further that it is generally preferred to utilize the reaction product in its entirety as an intermediate for the preparation of my adjuvants.

As indicated hereinbefore the intermediate reaction product can be used directly for the formation of my adjuvants or it can be subjected to an intervening treatment. Such treatment consists of centrifugation or filtration to remove any by-product, sludge, or other insoluble material which under certain circumstances may be formed. Likewise, any excess of volatile reactant or a volatile diluent, if used, can be removed by distillation. Furthermore, if desired, the intermediate product can be extracted with a suitable solvent such as liquid propane or isopropanol, or can be contacted with an adsorbent such as activated charcoal, silica gel, activated clay or the like.

To prepare my organolead adjuvants the above-described intermediate product is reacted with a suitable salt of the desired metal. For example, the reaction intermediates can be treated with an oxide, hydroxide, carbonate, or the like of the metal in question. It will be apparent, therefore, that a wide variety of metallic elements can be introduced into the intermediate products thereby forming a multitude of organolead adjuvants for use in accordance with the present invention. However, generally speaking, a preferred embodiment of the instant invention consists of forming and hence utilizing reaction products containing an alkali metal such as lithium, sodium, potassium and the like. An additional preferred embodiment of this invention resides in the utilization of alkaline earth metal containing reaction products as organolead adjuvants. Thus, by reacting the product obtained by reaction between a phosphorus sulfide and an organic reactant as above-described with a suitable salt of such metals as magnesium, barium, calcium, strontium, and the like efficacious adjuvants of this invention are formed. It will be apparent, however, that other metallic elements can be used to form suitable adjuvants. For example, aluminum, arsenic and other metals higher in the electromotive series form highly desirable additives for use in accomplishing the objects of this invention. The amount of the metallic salt used in preparing my adjuvants can be sufficient to neutralize all or part of the acidity of the intermediate reaction product. The reaction itself is preferably carried out at an elevated temperature in the range of about 180° to 350° F. in order to complete the neutralization.

The particular conditions employed are naturally contingent upon the nature of the materials in question. By way of example, one general method which can be used in forming my adjuvants is to conduct the reaction in the presence of a suitable diluent such as any of the typical hydrocarbon solvents. Another modification used in preparing my adjuvants is to conduct the reaction at superatmospheric pressure. This is found to be particularly efficacious in the preparation of metallic adjuvants of this invention formed from metals, the bases of which are relatively weak. Such is the case with aluminum. On the other hand, the utilization of higher pressures is frequently unnecessary particularly when the metallic element being introduced into my organolead adjuvants is capable of forming strong bases as in the case of the alkali metals.

Once the second step of the reaction has been completed the reaction product can be used in toto as an organolead adjuvant or it can be subjected to conventional treatments of the type described hereinbefore. Thus, recourse can be made to such steps as solvent extraction, distillation, filtration, centrifugation, and the like.

While the preparation of my adjuvants has been described in terms of a two-step process, it will be appreciated that under certain circumstances, a one-step process can be used. That is to say, with many of the prime reactants within the purview of this invention my adjuvants can be prepared by inter-mixing suitable quantities of a reactive phosphorus sulfide, an organic reactant and a metallic salt, with or without a diluent and subjecting this mixture to thermal treatment until the reaction is substantially complete. Further details regarding this method of preparing my adjuvants will be apparent to one skilled in the art.

The organolead antiknock agent utilized in the compositions of matter of the present invention consists of an organolead compound in which lead is directly bonded to carbon atoms. Such compounds are exemplified by the lead aryls, such as tetraphenyllead, and the lead alkyls, such as tetramethyllead, tetraethyllead, tetrapropyllead, tetrabutyllead, dimethyldiethyllead, methyltriethyllead, and the like, as well as mixtures of such compounds. Because of the generally superior characteristics of tetraethyllead and the ready accessibility thereof as an article of commerce, it constitutes a preferred embodiment of the organolead antiknock agent utilized in accordance with the instant invention.

With the various compositions within the scope of this invention the proportion of the reaction product utilized in conjunction with an organolead compound is such that there is a total of from between about 0.01 to about 0.80 theory of phosphorus. In this regard, a theory of phosphorus is defined as the amount of phosphorus theoretically required to react with the lead to form lead orthophosphate, which quantity is two atoms of phosphorus per three atoms of lead. However, generally speaking, it is sufficient to employ an amount of an organolead adjuvant of this invention such that there is an amount of phosphorus between about 0.05 and about 0.5 theory, with the best overall results usually being obtained with amounts of about 0.1 to about 0.2 theory of phosphorus, the last mentioned concentrations constituting a preferred embodiment.

Regarding many of the problems frequently associated with high octane quality fuel, an anomalous situation obtains. On one hand, an effective adjuvant for organolead compounds should possess stability against deterioration in common environments, compatibility with the chemical entities with which it comes in contact, and volatility so as to possess the characteristic frequently referred to as engine inductibility. On the other hand, the mere selection of a phosphorus compound to acquire the optimum characteristics enumerated above does not necessarily assure the effectiveness of the compound in combatting such phenomena as spark plug fouling, wild ping, and the like. It is entirely probable that some empirical relationship between physical properties and effectiveness in the obviation of such problems exists, but as yet the state of the art does not contain a satisfactory relationship of this type. However, the phosphorus materials within the purview of this invention, for the most part, possess the requisite physical properties adapting them for use as organolead adjuvants and at the same time are effective in obviating engine problems of the type described hereinbefore.

It will be apparent that there exists a number of variations in employing the adjuvants of this invention. For example, a facet of this invention involves the provision of a mixture of an organolead antiknock agent such as a lead alkyl and a metal-containing reaction product used as an adjuvant in accordance with the present invention. In such a case the resulting composition can be blended with hydrocarbon fuel of the gasoline boiling range to provide an improved fuel composition which under certain circumstances does not require the utilization of organic halogen-containing material as a scavenger. It is believed that under these conditions the presence of a quantity of phosphorus and sulfur as above-described and chemically bonded in accordance with the requirements of the adjuvants of this invention contributes sufficient scavenging action such that the amount and character of deposition in the engine are suitably controlled, notwithstanding the fact that lead phosphates generally have high melting points. Likewise, in this embodiment of the instant invention the general storage characteristics of organolead compounds are frequently enhanced.

Of perhaps more practical importance is a second variant of this invention, namely, the utilization of the aforesaid metal-containing reaction products in organolead-containing antiknock fluids. It is well known in the art that the most convenient means of marketing and blending organolead antiknock agents is in the form of an antiknock fluid which usually contains, in addition to the lead compound, one or more organic bromine and/or chlorine compounds and an organic dye for identification purposes. On occasion, such antiknock fluids likewise may contain minor proportions of diluents, antioxidants, metal deactivators, and the like. In line with the foregoing, therefore, a preferred embodiment of this invention involves providing improved antiknock fluids containing the above-decribed metal-containing reaction products. Such improved anti-knock fluids generally do not require the presence of a solubilizing agent or a stabilizer since the phosphorus compound itself is generally sufficiently miscible with the constituents of the antiknock fluid and imparts thereto a degree of stabilization. However, under some conditions additional benefits are to be derived by employing in the improved antiknock fluids of this invention the necessary quantities of such materials.

Still another variant of the present invention consists of providing improved fuel compositions. These normally consist of hydrocarbons of the gasoline boiling range containing a minor proportion of the aforesaid antiknock fluids of the present invention. It will be appreciated that the quantity of the antiknock fluid of the present invention utilized in my improved fuel compositions is primarily contingent upon the use for which the gasoline is intended. That is to say, when the fuel is intended for use in automotive engines such as passenger cars, trucks, buses, and the like an amount of any of my improved antiknock fluids equivalent to a lead content in the gasoline of from between about 0.53 and about 3.17 grams of lead per gallon is satisfactory. Thus, in the embodiments of this invention wherein I employ tetraethyllead as an antiknock agent, such concentrations are equivalent to from between about 0.5 and about 3 milliliters of the compound per gallon. With the advent of the more recent high compression ratio internal combustion engines, however, it is becoming increasingly apparent that benefits are to be derived by employing somewhat greater concentrations of the organolead material in automotive gasoline. On this basis, therefore, automotive fuels containing up to about 4.75 grams of lead per gallon are contemplated. In contrast, when the improved antiknock fluids of the present invention are utilized in fuel for aviation engines, somewhat higher concentrations are employed. Generally speaking, amounts of lead up to about 6.34 grams of lead per gallon can be utilized, although somewhat lesser quantities are presently in vogue. In other words, in the tetraethyllead-containing embodiments of this invention there can be present up to about 6 milliliters of tetraethyllead per gallon as an improved antiknock fluid of my invention. Concentrations above these limits can be employed in both motor and aviation fuels, practical considerations being the prime criterion for establishing the upper concentration limit. As indicated hereinabove, in all of the compositions of the present invention the amount of phosphorus is fixed within the limits above-described. Thus, in the preferred fuel embodiments of my invention there is an amount of phosphorus as a metal-containing reaction product such that there is from about 0.1 to 0.2 theory of phosphorus. In preparing the improved fuel compositions of this invention it is usually necessary only to add the requisite quantity of the improved fluid to the fuel, and by means of stirring, shaking, or other means of physical agitation, homogeneous fuel compositions are provided. Although the simplest means of preparing such fuels is to blend therewith the necessary quantity of an improved antiknock fluid of this invention, it is possible to add a conventional antiknock fluid to the fuel and subsequently blend therewith the necessary quantity of a metallic derivative of a product obtained by reaction between a phosphorus sulfide and an active hydrogen-containing aromatic compound. In addition to reversing this order of addition of conventional antiknock fluids and metal-containing reaction products, another variant within the purview of this invention is to blend with the fuel each of the individual constituents of my antiknock fluids separately.

The following specific examples wherein all parts and percentages are by weight are illustrative of the methods which can be employed in preparing the organolead adjuvants of this invention.

*Example I*

To a pressure reaction vessel is added 240 parts of cumene (isopropylbenzene) and 222 parts of phosphorus pentasulfide ($P_2S_5$). The temperature of the reactants is raised to 350° F. and maintained at this temperature for three hours. During this period a portion of the gas formed by the reaction is vented such that the pressure is maintained between 200 and 300 pounds per square inch. Upon the completion of the reaction, the product is filtered while hot. The yields of product obtained by this process are substantially quantitative. My adjuvant is prepared by placing 100 parts of the above product in a pressure reaction vessel together with 15 parts of lithium hydroxide ($LiOH \cdot H_2O$) and five parts of water. The temperature of this mixture is then raised to 250° F. for a period of two hours during which time the pressure is maintained in the order of 100 pounds per square inch. After this, the reactants are cooled to 200° F. and subjected to centrifugation. The solids-free product is then blown with air for two hours while maintaining the product at 250° F. Once the water has been removed by this treatment the adjuvant is subjected to filtration.

*Example II*

Substantially the same procedure is used for preparing the reaction intermediate as described in the previous example with the exception that the reactants consist of 270 parts of p-cymene (p-methylisopropylbenzene) and 222 parts of $P_2S_5$. It is found that upon completion of the pressure reaction substantially quantitative yields of reaction product are obtained. As in the previous example it is advantageous to filter the product while it is hot, so as to remove minor amounts of solids which are formed. To 100 parts of this product is added 27 parts of barium hydroxide ($Ba(OH)_2 \cdot 8H_2O$). These reactants are then heated for a period of two hours at a temperature of 180° F. and then two more hours at 250° F. while contemporaneously air-stripping the product. The product so formed is then centrifuged and filtered so as to remove minor amounts of solid materials which have been formed.

The reactants and reaction conditions described in the previous specific examples are merely illustrative. For example, by utilizing the above and similar reaction conditions it is possible to prepare suitable adjuvants of this invention by reacting a phosphorus sulfide such as $P_2S_5$, $P_4S_7$ and the like with such organic reactants as ortho cymene, tetralin, methyl naphthalenes and their derivatives, and in turn the product with the oxides or hydroxides of zinc, potassium, calcium, magnesium or tin.

To illustrate the effectiveness of the improved antiknock fluids of the present invention, consideration can be given to the problem of spark plug fouling. In order to do this, recourse can be made to the following general test procedure utilizing a standard modern V-8 engine equipped with overhead valves having a 3¾" bore, a 3 7/16" stroke, a 303.7 cubic inch displacement, and a compression ratio of 7.25 to one equipped with commercially available spark plugs. In order to establish a base line this engine is operated in conjunction with an engine dynamometer on a standard commercial fuel containing 3 milliliters of tetraethyllead per gallon as conventional antiknock fluid containing 0.5 theory of bromine as ethylene dibromide and 1.0 theory of chlorine as ethylene dichloride. The engine is operated under a durability schedule used for spark plug deposit accumulation patterned after road conditions experienced in city driving which are known to produce spark plug fouling of the greatest magnitude. Such operation is substantially continuous until a number of spark plug failures is detected thereby establishing a quantitative measure of the degree of spark plug fouling which can be expressed in average hours to plug failure. The engine is then freed from deposits and equipped with new spark plugs. The same procedure is repeated using the same fuel base stock to which is added an improved antiknock fluid of the present invention.

By way of example, when 300 gallons of a petroleum hydrocarbon fuel available as an article of commerce is treated with 900 milliliters of tetraethyllead in a fluid containing tetraethyllead, 0.5 theory of bromine as ethylene dibromide and 1.0 theory of chlorine as ethylene dichloride, a suitable fuel is prepared for establishing a base line of hours to spark plug failure. When the standard V–8 engine described hereinbefore is then operated on this homogeneous fuel composition, it is found that in an average time of about 34 hours 3 spark plug failures have occurred.

In contrast, when a suitable quantity of the same fuel base stock is treated with an improved antiknock fluid of the present invention, greatly enhanced spark plug life is obtained. For example, when 1000 gallons of the same fuel base stock is treated with 3 liters of tetraethyllead as a fluid comprising 0.5 theory of bromine as ethylene dibromide, 1.0 theory of chlorine as ethylene dichloride, and 0.2 theory of phosphorus as the lithium salt of the reaction product between cumene and $P_2S_5$, an improved fuel of the present invention results. Upon intimately mixing the aforementioned components the homogeneous fuel composition containing 3.0 milliliters of tetraethyllead per gallon is suitable for use in the above-described engine test procedure. It is found that a substantial improvement in spark plug performance as evidenced by the greater period of continuous engine operation results from the utilization of such an improved fuel of the present invention. That is to say, the average hours to three spark plug failures is substantially in excess of the base line figure of 34 hours.

When such adjuvants as those formed by the reaction of metal oxides or hydroxides with the reaction products of $P_2S_5$ with aromatic hydrocarbons containing an active hydrogen atom, and the like are utilized in accordance with the present invention comparable effectiveness regarding minimization of spark plug fouling is obtained. Without desiring to be bound by the following explanation regarding the enhanced effectiveness of the adjuvants of this invention, a tenable explanation apparently involves a proper balance between physical properties such as stability, volatility, solubility, compatibility and the like and the energy relationships or ease of decomposition which may attribute to the over-all effectiveness of my adjuvants by facilitating decomposition at the proper instant in the engine cycle.

To still further illustrate the enhanced effectiveness of the organolead-containing compositions of the present invention consideration can be given to the problem of wild ping. To demonstrate the effectiveness of my compositions in this regard, I can subject both a hydrocarbon fuel treated in accordance with this invention and another portion of the same hydrocarbon fuel treated with a conventional antiknock mixture to a test procedure involving the use of a single-cylinder CFR knock test engine equipped with an L-head cylinder and a wild ping counter which records the total number of wild pings which occur during the test periods. Such apparatus includes an extra spark plug used as an ionization gap which is installed in a second opening in the combustion chamber. A mechanical breaker switch driven at camshaft speed is also provided which, when closed, makes the wild ping counter ineffective for the duration of the normal flame in the combustion chamber. The breaker is open for 80 crankshaft degrees between 70° BTC (before top dead center) and 10° ATC (after top dead center). If a flame front induced early in the cycle by deposits reaches the ionization gap during this open period, the counter registers a wild ping regardless of the audible manifestations. During normal combustion with ignition timing at TDC (top dead center) the flame front reaches the ionization gap at 15 to 18° ATC during the period wherein the points are closed and no count is made. The actual test procedure consists essentially of operating the test engine initially having a clean combustion chamber under relatively mild cycling conditions for deposit formation until an equilibrium with regard to deposit-induced autoignition is reached. The effect of fuels treated in accordance with the instant invention is determined by comparing the test results obtained using the fuel treated with an improved fluid of the present invention with those obtained using a fuel treated with a conventional antiknock mixture. Since the wild pin counter records the total number of wild pins which occur during the test procedures, a quantitative expression for the amount of deposit-induced autoignition is the number of wild pings per hour of operation. The effectiveness of my improved fuel composition in virtually eliminating deposit-induced autoignition will be apparent from the following specific examples.

*Example III*

To 100 gallons of a commercially available blend of straight run, catalytically cracked, and polymer blending stocks was added and thoroughly mixed 300 milliliters of tetraethyllead as antiknock fluid comprising tetraethyllead, 0.5 theory of bromine as ethylene dibromide, and 1.0 theory of chlorine as ethylene dichloride. The resulting homogeneous fuel composition was then utilized as the fuel in the previously designated single-cylinder laboratory test engine to formulate a base line of wild ping. It was found that there were 170 wild pings per hour of engine operation.

*Example IV*

An improved antiknock fluid composition of the present invention is prepared by adding 0.1 theory of phosphorus as the product obtained by reaction between $P_2S_5$, mixed cymenes and magnesium oxide to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition is obtained by intimately mixing the aforementioned components. The entire quantity of improved antiknock fluid composition so prepared is added to 50 gallons of a commercially available blend of straight run, catalytically cracked, and polymer blending stocks. Upon mechanically agitating the resulting mixture a homogeneous fuel composition is prepared. The laboratory single-cylinder test engine as described previously is then operated on this improved fuel composition while contemporaneously determining the rate of wild pings as detected by the wild ping counter. It is found that the utilization of an improved antiknock fuel of the present invention greatly minimizes the rate of wild pings per hour as contrasted with a conventional fuel which produce 170 wild pings per hour. Consequently, an improved fuel composition of this invention results in a substantial reduction in this deposit-induced engine phenomenon.

The foregoing specific examples are merely illustrative of the beneficial effects produced by the improved organolead containing compositions of the present invention. It will be apparent that it is preferred to utilize the adjuvants of this invention such as the potassium salt of $P_2S_5$-p-chlorocumene, the zinc salt of $P_4S_7$-1,4-dihydronaphthalene, the mixed calcium-barium salt of $P_2S_5$-2,4,6-trimethylisopropyl benzene and the like in high octane quality fuel because of the fact that most of the deposit-induced problems exist on combustion of such fuels.

The superior effectiveness of the preferred embodiments of this invention, namely a metal-containing reaction product as defined hereinbefore in the diminution of deposit-induced engine problems is further unexpected when considering the prime constituents phosphorus and sulfur which are contained therein. On the one hand, both sulfur and phosphorus compounds have heretofore been judiciously avoided as much as possible in fuel because of their notorious deleterious effects, particularly in the realm of organolead antagonism and the like. In the case of sulfur, for example, refiners have long been resorting to various means of removing sulfur compounds from hydrocarbons of the gasoline boiling range because of their recognized deleterious effects on antiknock activity, engine cleanliness, storage stability, and the like. However, the adjuvants of this invention possessing considerable proportions of phosphorus and sulfur do not bring about such deleterious effects. Furthermore, another surprising effect has been noted, namely, the fact that the presence of phosphorus-to-sulfur bonds produces a greater effectiveness regarding wild ping than that exhibited by compounds possessing either phosphorus or sulfur, and likewise, a mixture of phosphorus- and sulfur-containing compounds. This fact is evidenced by the findings that the presence of added sulfur in a conventional leaded fuel not only has no beneficial effect on wild ping but actually results in an increase in this phenomenon. By way of example, it was found that the addition of 5 theories of sulfur as a mixture consisting of one theory of di-t-butyl disulfide, 2 theories of dibutyl sulfide, and 2 theories of thiophene, a mixture representative of the average sulfur constituents of petroleum hydrocarbon fuel, to a conventional gasoline containing 3 milliliters of tetraethyllead per gallon resulted in a wild ping rate of 93 wild pings per hour. In contrast, the same base fuel containing the same concentration of tetraethyllead produced 74 wild pings per hour. Thus, the incorporation of sulfur-containnig compounds different from the sulfur-containing adjuvants utilized in this invention resulted in a wild ping rate amounting to 125 percent of the base line. That is to say, the presence of sulfur-containnig compounds generally increased the rate of wild ping, whereas the presence of a considerable amount of sulfur when suitably bonded in accordance with the present invention results in a definite improvement in this deposit-induced phenomenon. In view of the foregoing, therefore, the apparent conclusion to be reached is that the chemical bonds between the two prime elements making up my adjuvants in some currently unexplainable manner produce enhanced effectiveness with regard to deposit-induced phenomena without resulting in secondary deleterious problems normally attributed to the presence of each of the elements when used separately or as mixtures of individaul phosphorus- and sulfur-containing compounds.

As indicated,, an additional important advantage obtained from practicing this invention is the fact that my adjuvants have little or no antagonistic effect upon the antiknock agent used in the fuel. In line with the enhanced effectiveness of my organolead adjuvants, this surprising benefits regarding a minimum of organolead destructiveness is perhaps associated with the degree of oxidative stability inherent in my metal-containing adjuvants. In other words, it is not inconceivable that my organolead adjuvants are capable of decomposing at the proper instant in the engine cycle so as to exhibit the beneficial effect regarding deposit-induced engine problems while at the same time decomposing at a time during the engine cycle sufficiently far removed from the point at which the organolead compound exerts its beneficial antiknock activity.

Because of their adaptability the adjuvants of the present invention can be successfully utilized with any of the well-known organolead antiknock agents as indicated hereinbefore. Likewsie, insofar as the halide scavengers are concerned, the metal-containing reaction products used as adjuvants in this invention can be employed in antiknock fluids and fuels containing such materials as ethylene dibromide, ethylene dichloride, mixed dibromotoluenes, trichlorobenzenes, and in general such organic halide scavengers as those disclosed in U. S. 1,592,954; 1,668,022; 2,364,921; 2,398,281; 2,479,900; 2,479,901; 2,479,902; 2,479,903; and 2,496,983. Likewise, the adjuvants of this invention can be used in conjunction with other well-known motor fuel adjuvants such as antioxidants, organolead stabilizers, organic dyes, solubilizers, and indeed with other catalytically active materials frequently employed in fuel.

Having fully described the nature of the present invention, the need therefor, and the best mode devised for carrying it out, it is not intended that this invention be limited except within the spirit and scope of the appended claims.

I claim:

1. An antiknock additive for use in hydrocarbon fuels of the gasoline boiling range, said additive comprising an organolead antiknock agent and a metallic derivative of a product obtained by reaction between (1) a phosphorus sulfide selected from the group consisting of $P_2S_5$ and $P_4S_7$ and (2) an organic compound containing at least one aromatic radical, from about 9 to about 40 carbon atoms and a hydrogen atom capable of reacting with said phosphorus sulfide to form hydrogen sulfide, said compound being selected from the group consisting of (a) trihydrocarbon-substituted methanes having the formula

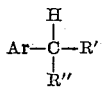

wherein R' and R'' are univalent hydrocarbon radicals and Ar is an aryl radical, and (b) dihydropolycyclic compounds containing only elements selected from the group consisting of carbon, hydrogen, and heterocyclic nitrogen atoms, said reaction comprising heating from about 0.4 to about 5 moles of said compound per mole of said sulfide to a temperature at which hydrogen sulfide is released; said metallic derivative being prepared by reacting said product at a temperature in the range of about 180 to 350° F. with an amount of a metallic base selected from the group consisting of oxides, hydroxides and carbonates sufficient to neutralize at least a part of the acidity of said product; said metallic derivative being present in said additive in amount such that the phosphorus-to-lead atom ratio is from about 0.02/3 to about 1.6/3.

2. The additive of claim 1 further characterized in that the antiknock agent is a lead alkyl.

3. The additive of claim 1 further characterized in that the antiknock agent is tetraethyllead.

4. An antiknock additive for use in hydrocarbon fuels of the gasoline boiling range said additive consisting essentially of tetraethyllead, a scavenging amount of organic halide material capable of reacting with the lead during combustion in a spark ignition internal combustion engine to form volatile lead halide, said material containing only elements selected from the group consisting of bromine, chlorine, carbon, hydrogen and oxygen; and a metallic derivative of a product obtained by reaction between (1) a phosphorus sulfide selected from the group consisting of $P_2S_5$ and $P_4S_7$ and (2) an organic compound containing at least one aromatic radical, from about 9 to about 40 carbon atoms and a hydrogen atom capable of reacting with said phosphorus sulfide to form hydrogen sulfide, said compound being selected from the group consisting of (a) trihydrocarbon-substituted methanes having the formula

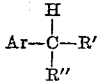

wherein R' and R'' are univalent hydrocarbon radicals and Ar is an aryl radical, and (b) dihydropolycyclic compounds containing only elements selected from the group consisting of carbon, hydrogen, and heterocyclic nitrogen atoms, said reaction comprising heating from about 0.4 to about 5 moles of said compound per mole of said sulfide to a temperature at which hydrogen sulfide is released; said metallic derivative being prepared by reacting said product at a temperature in the range of about 180 to 350° F. with an amount of a metallic base selected from the group consisting of oxides, hydroxides and carbonates sufficient to neutralize at least a part of the acidity of said product; said metallic derivative being present in said additive in amount such that the phosphorus-to-lead atom ratio is from about 0.02/3 to about 1.6/3.

5. The additive of claim 4 further characterized in that said scavenging amount of organic halide material is about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride.

6. Hydrocarbon fuel of the gasoline boiling range adapted for use as fuel for spark ignition internal combustion engines containing up to about 6.34 grams of lead per gallon as an organolead antiknock agent, and a metallic derivative of a product obtained by reaction between (1) a phosphorus sulfide selected from the group consisting of $P_2S_5$ and $P_4S_7$ and (2) an organic compound containing at least one aromatic radical, from about 9 to about 40 carbon atoms and a hydrogen atom capable of reacting with said phosphorus sulfide to form hydrogen sulfide, said compound being selected from the group consisting of (a) trihydrocarbon-substituted methanes having the formula

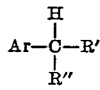

wherein R' and R" are univalent hydrocarbon radicals and Ar is an aryl radical, and (b) dihydropolycyclic compounds containing only elements selected from the group consisting of carbon, hydrogen, and heterocyclic nitrogen atoms, said reaction comprising heating from about 0.4 to about 5 moles of said compound per mole of said sulfide to a temperature at which hydrogen sulfide is released; said metallic derivative being prepared by reacting said product at a temperature in the range of about 180 to 350° F. with an amount of a metallic base selected from the group consisting of oxides, hydroxides and carbonates sufficient to neutralize at least a part of the acidity of said product, said metallic derivative being present in said fuel in amount such that the phosphorus-to-lead atom ratio is from about 0.02/3 to about 1.6/3.

7. The hydrocarbon fuel composition of claim 6 further characterized in that it contains from about 0.53 to about 4.75 grams of lead per gallon as tetraethyllead, about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride.

8. The composition of claim 6 wherein the metal of said metallic derivative is selected from the group consisting of alkali and alkaline earth metals.

References Cited in the file of this patent
UNITED STATES PATENTS

| | | |
|---|---|---|
| 2,378,793 | Rudel | June 19, 1945 |
| 2,398,281 | Bartholomew | Apr. 9, 1946 |
| 2,405,560 | Campbell | Aug. 13, 1946 |
| 2,439,819 | Mussellman | Apr. 20, 1948 |
| 2,439,820 | Mussellman | Apr. 20, 1948 |
| 2,534,217 | Bartleson | Dec. 19, 1950 |
| 2,712,528 | Hill et al. | July 5, 1955 |

FOREIGN PATENTS

| | | |
|---|---|---|
| 683,405 | Great Britain | Nov. 26, 1952 |